Dec. 29, 1970  A. H. WIDDOWSON  3,550,398
PATTERNING MECHANISM FOR KNITTING MACHINES
Filed Jan. 23, 1969  6 Sheets-Sheet 2
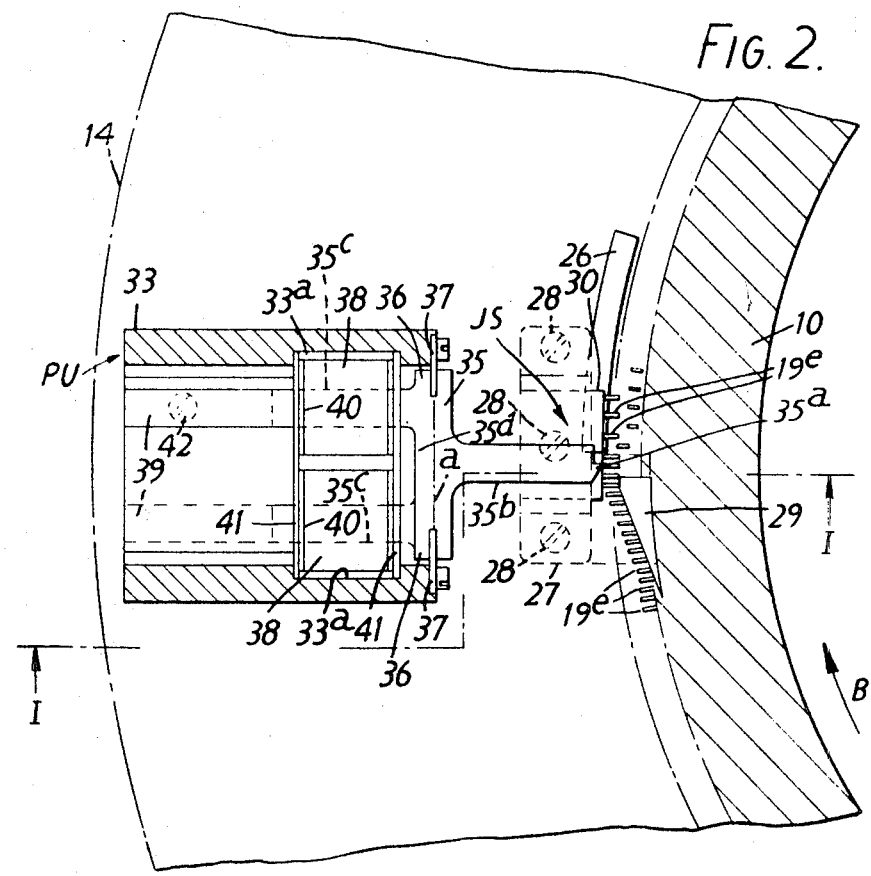
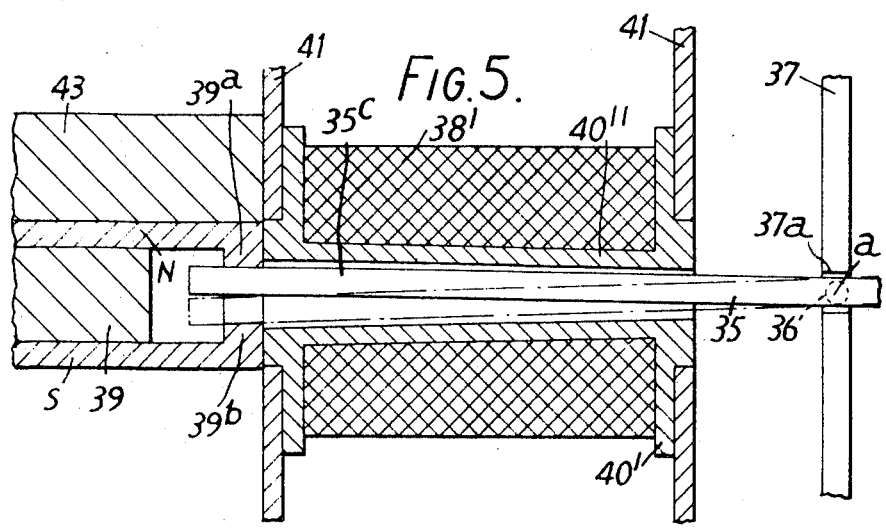

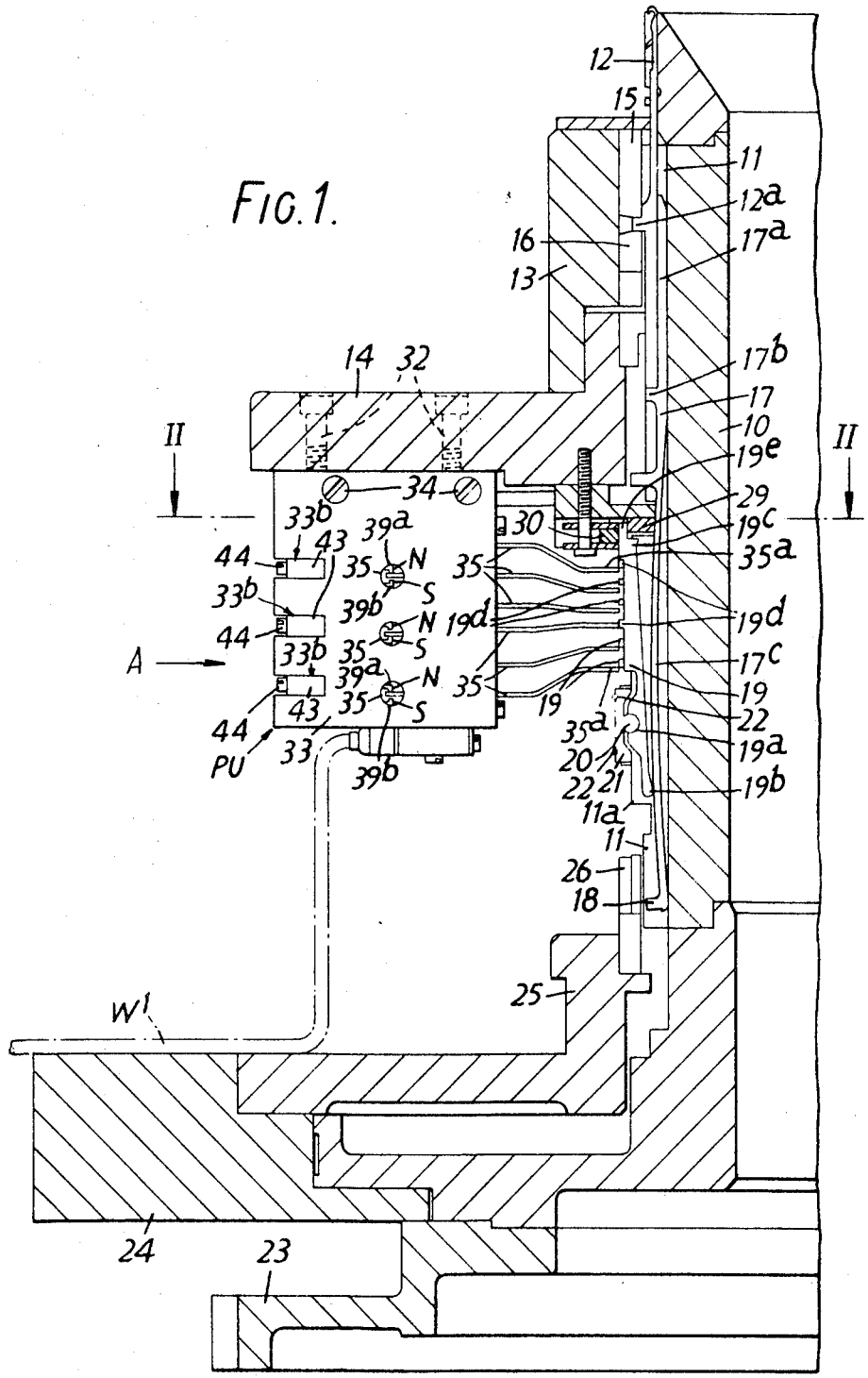

Dec. 29, 1970     A. H. WIDDOWSON     3,550,398
PATTERNING MECHANISM FOR KNITTING MACHINES
Filed Jan. 23, 1969     6 Sheets-Sheet 3

Dec. 29, 1970     A. H. WIDDOWSON     3,550,398

PATTERNING MECHANISM FOR KNITTING MACHINES

Filed Jan. 23, 1969     6 Sheets-Sheet 4

Dec. 29, 1970     A. H. WIDDOWSON     3,550,398
PATTERNING MECHANISM FOR KNITTING MACHINES
Filed Jan. 23, 1969                      6 Sheets-Sheet 6
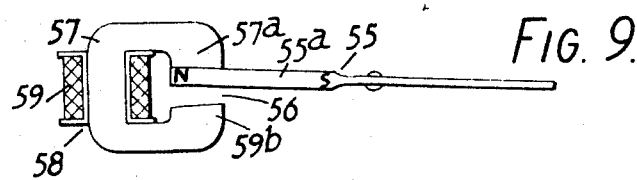
FIG. 9.
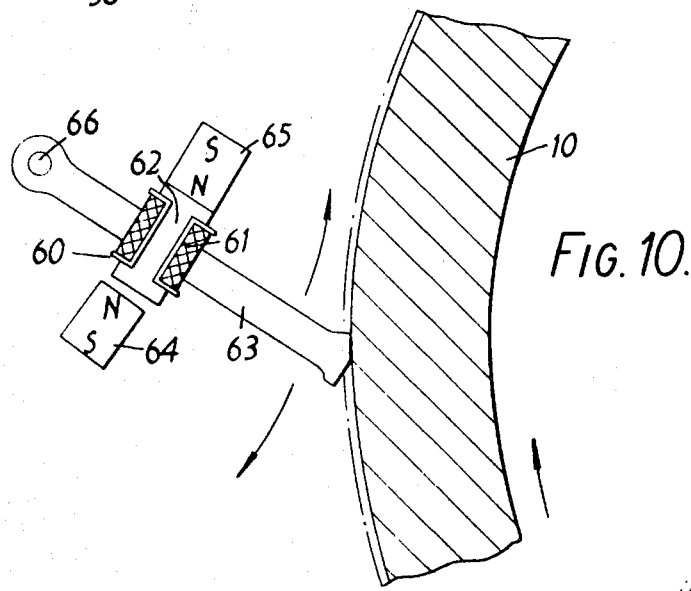
FIG. 10.
FIG. 11.
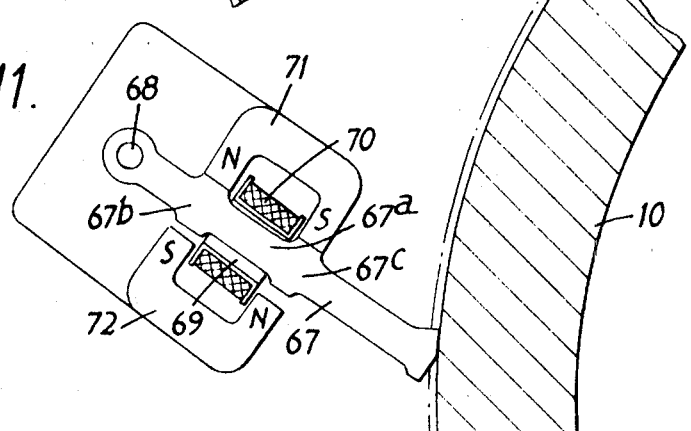
FIG. 12.
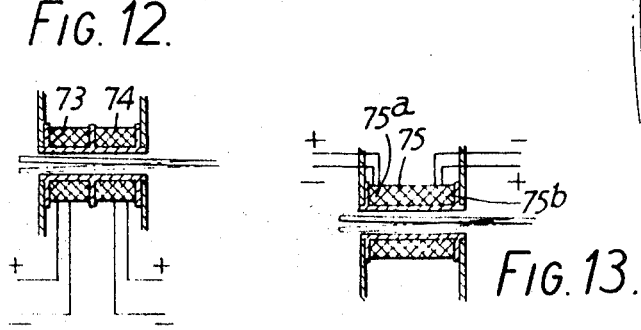
FIG. 13.

United States Patent Office 3,550,398
Patented Dec. 29, 1970

3,550,398
PATTERNING MECHANISM FOR
KNITTING MACHINES
Albert Henry Widdowson, Leicester, England, assignor
to Wildt Mellor Bromley Limited, Leicester, England,
a British company
Filed Jan. 23, 1969, Ser. No. 793,436
Claims priority, application Great Britain, Feb. 16, 1968,
7,657/67
Int. Cl. D04b 15/78
U.S. Cl. 66—50                                      12 Claims

ABSTRACT OF THE DISCLOSURE

A multi-feed knitting machine equipped with instruments having patterning butts in superimposed planes. Selectors, actuated by closely adjacent electro-magnetic means act upon these butts. Pulse-producing programming means selectively control such actuation. Each selector is deflectable into an operative position to act upon the butts, and vice versa. The electro-magnetic means are pulsed in opposite directions to move the selectors to their operative and inoperative positions respectively. Permanent magnetic means are combined with the electro-magnetic means of each selector and mutual attraction of the two, as the result of a pulse, causes the selector to move to and be held in the relevant one of its positions.

---

Figure 3:
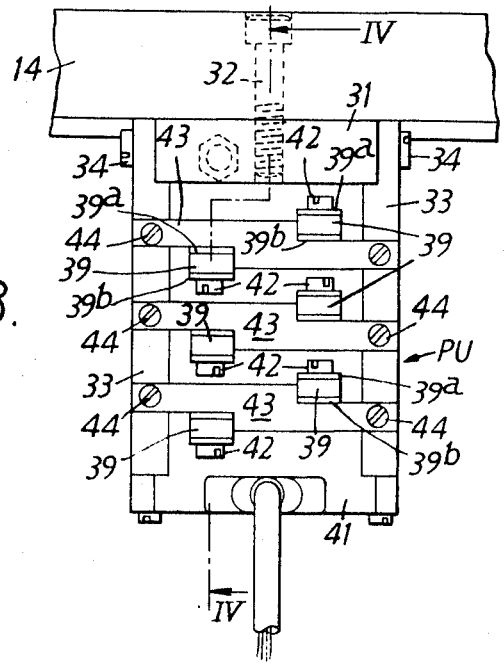

This invention appertains to patterning systems for multi-feed knitting machines, and has reference particularly to such machines of the class equipped with individually operable needles or any other appropriate knitting instruments and means for exercising selective and individual control over these instruments, through the medium of patterning butts which, according to predetermined patterning requirements are adapted either to be left undisturbed so as to permit operation or behaviour of the corresponding needles in a desired manner, or to be acted upon so that the relevant needles will either remain quiescent or be permitted to function in an alternative manner.

The expression "patterning butts" is used herein in a generic sense and is intended to be sufficiently broad to cover not only the more usual case in which the butts are provided on jacks, sliders, pressers or like instruments separate from, but in the same needle cylinder tricks as, the needles, but also the case in which the butts are on the needles themselves.

For convenience in the following further description, needles, jacks or the like will be generically referred to as "knitting instruments."

The invention, moreover, has reference exclusively to a patterning system of the kind wherein the patterning butts are disposed in a multiplicity of superimposed planes, and which includes at least one patterning unit of a previously proposed form comprising, in combination, a bracket, a bank of selectors individually movable within the bracket and operable to act upon, e.g. press in, butts in the said planes, a stack of electro-magnetic means for selectively actuating the said selectors, and programming means movable at a speed related to, or in time with, the motion of the knitting machine and adapted to produce signals or impulses which influence the operation of electrical or/ and electronic switch or equivalent means incorporated in circuitry including the electro-magnetic means.

In a patterning system of this kind, the operative ends of the selectors act either directly upon the patterning butts or upon intermediate movement-transmitting elements and, in turn, the electro-magnetic means are arranged for action directly or indirectly upon the selectors.

The invention is broadly applicable both to circular knitting machines as well as to flat V-bed and flat purl knitting machines.

Thus, the invention is applicable to a multi-feed circular knitting machine of the revolving cylinder type, in which case a plurality of circumferentially spaced stationary patterning units of the form referred to are suitably grouped around the rotary cylinder, with the selectors capable of acting directly upon the patterning butts, and the programming means selectively influence the electro-magnetic means of the several stacks so that each stack independently controls every needle in the circumference of the machine.

It is, however, also possible to apply this invention to a multi-feed circular knitting machine of the stationary needle cylinder type, in which alternative case it is possible to employ only one patterning unit of the form concerned, this unit being stationary and selectively actuating a plurality of stacks of movement-transmitting elements grouped around the cylinder and arranged to rotate in unison with the revolving cam box of the machine, each stack of movement-transmitting elements in turn passing by the bank of selectors in the single patterning unit and functioning to transfer selections of the said selectors to the knitting instruments. In such alternative case, moreover, the electro-magnetic means in the single stack may be selectively influenced a number of times per revolution corresponding to the number of stacks of movement-transmitting elements revolving with the cam box.

But in another version of the invention applied to a machine of the stationary needle cylinder type, stacks of movement-transmitting elements are dispensed with and, instead, a plurality of patterning units of the form concerned are arranged to revolve with the cam box for action directly upon the patterning butts.

The object of the present invention is to provide, in a patterning system of the kind herein referred to, improved magnetic means for selectively actuating the selectors and for positively holding the latter in their operative and inoperative positions.

According to this invention, each of the selectors in the or each patterning unit is so mounted for movement as to enable the leading portion thereof to be moved from an inoperative position in which it is prevented from influencing patterning butts on knitting instruments into an operative position either for direct action or to effect indirect action upon such butts, and vice versa, and there are provided on or wholly or partly around each selector electro-magnetic means adapted to be so electrically pulsed in opposite directions as to cause the selector, by mutual attraction of the electro-magnetic means and permanent magnetic means, taking place at opposite sides of the said selector, to be moved to and held by the permanent magnetic means in its operative and inoperative positions respectively.

Thus, the improved magnetic means in association with each selector comprise an electro-magnet co-operable with permanent magnetic means.

The operative end of each of the selectors may be movable upwardly and downwardly relatively to the knitting instruments provided with the patterning butts, the selector considered as a whole being fixed so far as concerns any inward and outward radial or arcuate movement thereof. In such a case, each selector is normally maintained either in the corresponding butt plane or just above or below and thus clear of said plane, energisation of the associated electromagnet means by a pulse in the relevant sense being relied on to tilt or deflect the selector and so displace its operative end either upwardly or downwardly (according to the chosen arrangement)

either out of or into the butt plane, as the case may be. In this way, all protruding patterning butts in a plane occupied by a selector will be acted upon, e.g. pressed in, by that selector—either directly or through the medium of an intermediate movement-transmitting element.

Alternatively, however, each selector may remain permanently in the corresponding butt plane, being turnable in that plane about a suitable fulcrum or pivotal axis so that its operative end can be swung to and fro in an arcuate path towards and away from the relevant patterning butts.

The aforementioned programming means may be of any suitable character. For instance, they may include an electronic reader for scanning pattern information. Although such a reader may be adapted to scan an original graph or pattern layout, it preferably includes either a punched strip or band having therein appropriate dispositions of holes, or a strip or band bearing light-transmitting spots or equivalent or a magnetic tape or film— progressive movements of any of these producing the signals or impulses necessary to effect successive re-selections of the electrical or/and electronic switch or equivalent means.

Figure 4:
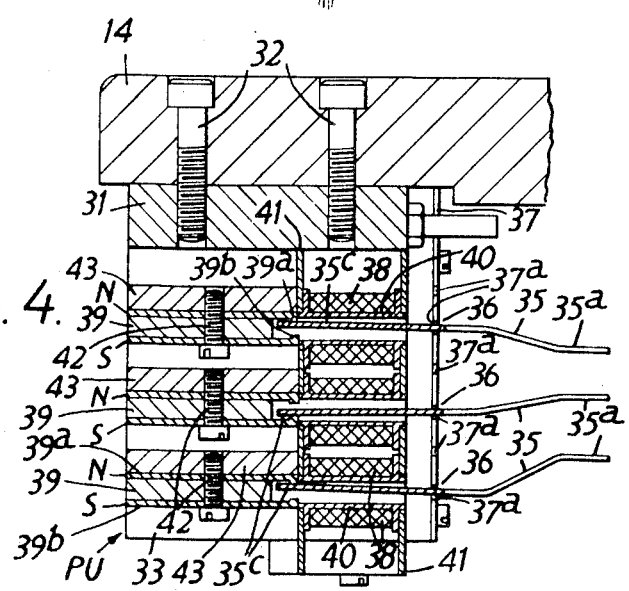
Figure 6:
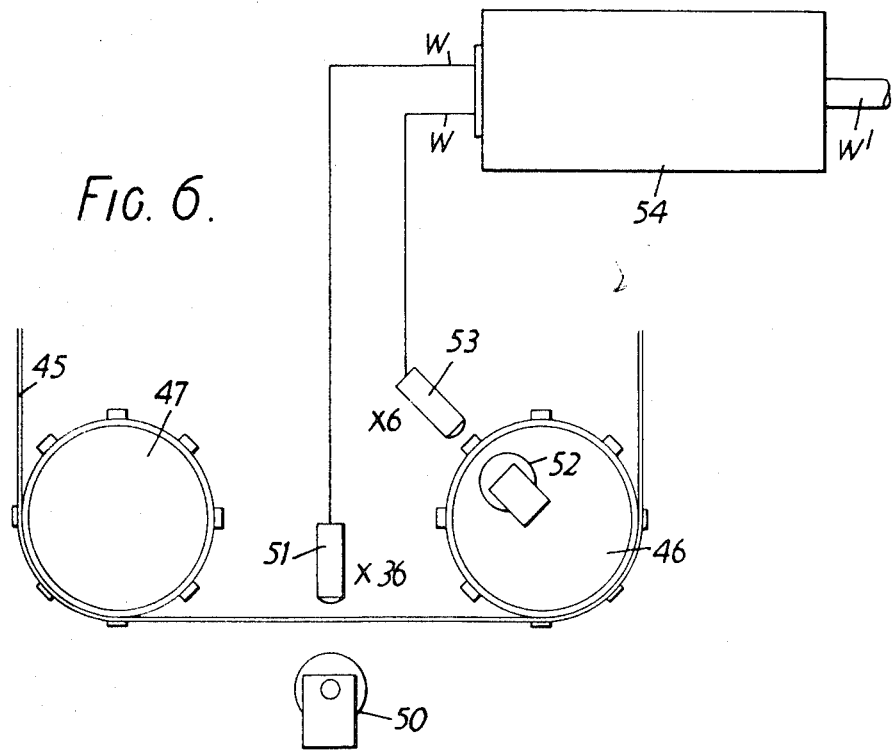
Figure 7:
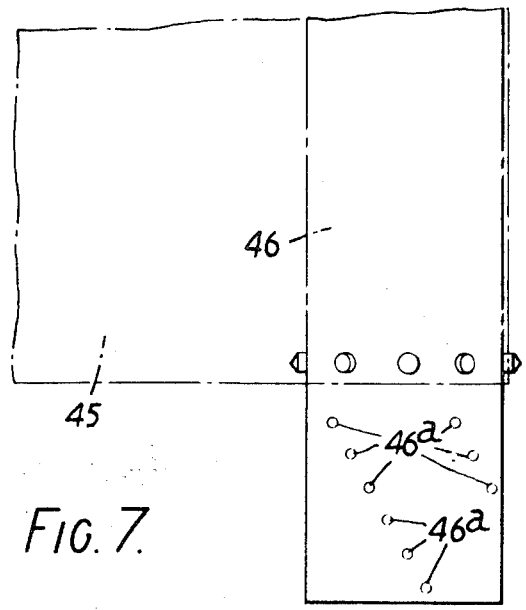
Figure 8:
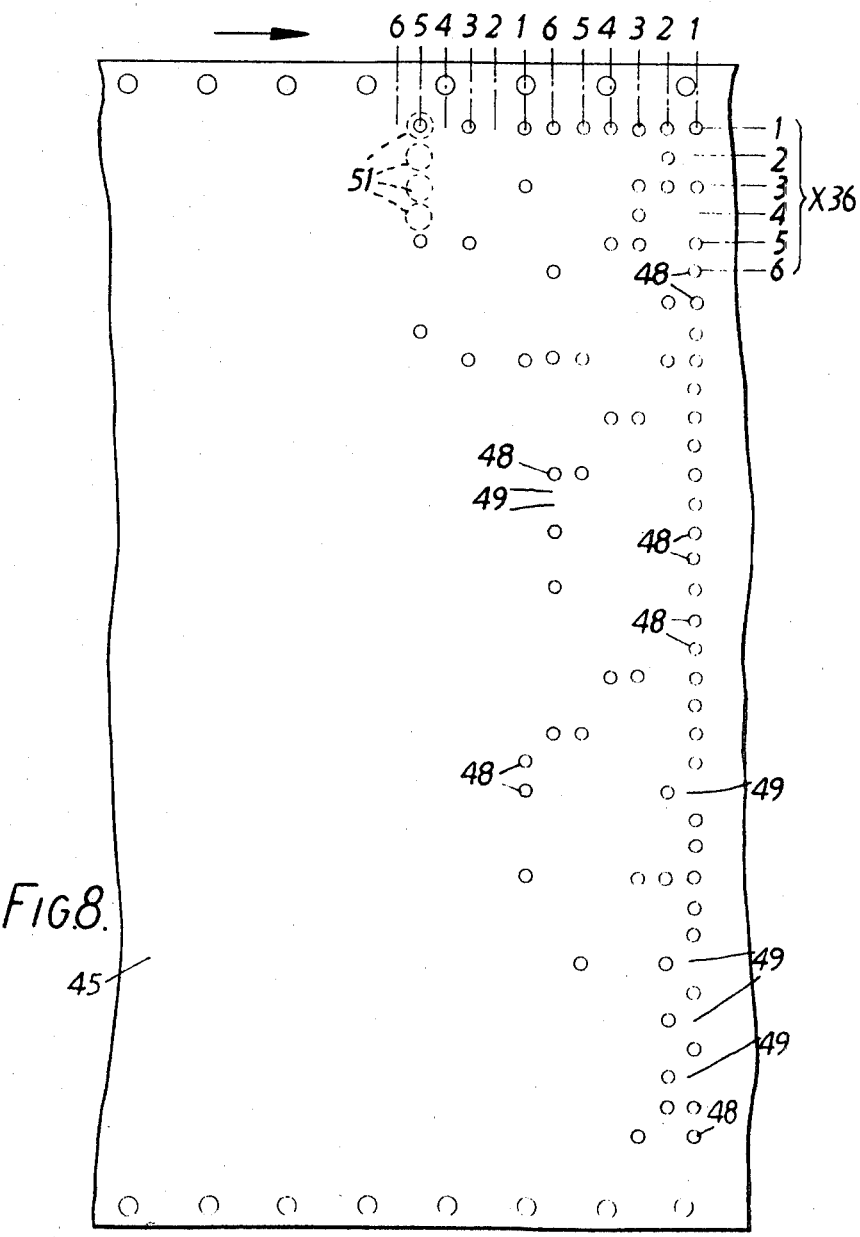

In order that the invention may be more clearly understood and readily carried into practical effect, specific examples thereof as applied to a multi-feed circular knitting machine of the revolving cylinder type will now be described with reference to the accompanying drawings, wherein:

FIG. 1 is a vertical sectional view, taken on the line I—I of FIG. 2, of so much of the head of the machine as is necessary to illustrate the application thereto of a patterning unit of the improved form, FIG. 2 is a sectional plan view taken on the line II—II of FIG. 1, FIG. 3 is an outer end view of the patterning unit as seen in the direction of the arrow A in FIG. 1, FIG. 4 is a longitudinal sectional view of the said unit taken on the line IV—IV of FIG. 3, FIG. 5 is a detail longitudinal sectional view through the electro-magnetic coil and the pole pieces of a permanent magnet associated with a tiltable selector, the view illustrating an ideal form of the said coil, as will be hereinafter described, FIG. 6 is a diagram depicting, merely in broad outline, the programming means for producing the signals or impulses which influence the electro-magnetic means, FIG. 7 is a detail view of the routing drum included in such programming means, FIG. 8 represents a fragmentary portion of the pattern-controlling film strip employed in said programming means, FIG. 9 is a detail view showing a form of the invention in which a fulcrummed selector is itself in the form of a pivoted permanent magnet, FIGS. 10 and 11 are sectional plan views illustrating the alternative embodiments of the invention in which each selector remains permanently in the corresponding butt plane, and FIGS. 12 and 13 illustrate alternative forms of coils for the electro-magnets.

Referring to FIGS. 1 and 2 of the drawings, the rotary needle cylinder of the machine is designated by the numeral 10. This cylinder is formed in the usual way with circumferentially spaced, axially extending tricks 11 for accommodation of individually slidable latch needles 12. Surrounding the upper portion of the needle cylinder 10 is a stationary annular cam box 13. This box, carried by an annular support plate 14, is fitted with needle-operating cams, such as 15 and 16, arranged for action upon butts 12a on the needles 12.

Arranged in the same cylinder trick 11 as each of the needles 12 is a corresponding needle-actuating jack 17. As will be seen in FIG. 1, the upper portion 17a of each jack extends behind its needle and is formed with a shoulder 17b for bearing upon the lower extremity of the said needle. Each jack 17, moreover, is provided with a depending spring extension 17c at the lower end of which is provided a bottom operating butt 18.

In a forward protrusion 11a of each cylinder trick 11 is accommodated a pressure 19 which is arranged in an upright stance in front of the depending extension 17c of the corresponding jack 17. Each such presser is fulcrummed at 20 between its opposite ends for which purpose it has formed in its front edge a semi-circular recess 19a to enable it to be engaged with the fulcrum 20. The latter is constituted by a rib projecting from the inner surface of a fulcrum ring 21 which is held in position upon the cylinder 10 by means of spring bands 22.

The drive gear for the rotary needle cylinder 10 is indicated at 23 and, set into the body 24 of the machine head, is a stationary ring 25 serving to carry a plurality of jack raising cams 26—one per feed. Only one such raising cam is, of course, shown in each of FIGS. 1 and 2, this cam being provided immediately in advance of knitting cams at the feed.

The illustrated arrangement is such that, normally, the bottom operating butt 18 of each jack 17 is held, by the inherent resilience of the spring extension 17c of the jack, in an outward position in which, with the cylinder 10 rotating in the direction of the arrow B in FIG. 2, the said butt will as a matter of course be acted upon by the jack raising cam 26 at a jack selecting station JS in advance of a feed: as a consequence, the jack, in company with its needle 12, is raised to a height at which the needle is caused to knit at the feed. If, on the other hand, the spring extension 17c is pressed inwardly against its inherent resilience at the station JS, the bottom butt 18 will be withdrawn inwardly clear of the jack raising cam 26 as a result of which the jack will not be raised and its needle will not knit at the feed. As will, therefore, be appreciated the lower end 19b of each presser 19 is normally held outwards by the spring extension 17c of the corresponding jack 17 located behind it whereas the upper end 19c of the presser is normally held inwards towards the cylinder.

The patterning system employed for selectively positioning the jacks 17 at the station JS will now be described. The upwardly directed stem portion of each presser 19, above the fulcrum 20, initially has formed thereon a plurality of frangible patterning butts 19d disposed in a multiplicity of superimposed planes. In the particular example illustrated there are six butt planes—although this number may vary. All but one of the patterning butts on each presser 19 is broken off, the pressers being arranged with successive patterning butts in the different planes disposed in predetermined sequences, e.g. oblique parallel lines, around the cylinder 10. Moreover, the upper extremity of each pressure 19 is rabbetted suchwise as to provide thereon an upstanding butt 19e. Immediately in advance of the station JS there is provided, on a fixed support 27 secured by screws 28 beneath the cam box support plate 14, a cam 29 which is arranged for action upon the rear edges of the upstanding presser butts 19e for the purpose of swinging the upper ends of all of the pressers outwards seriatim immediately prior to selection thereof. As a result of this cam action, the lower ends 19b of all the pressers in turn are turned inwards to press in the spring extensions 17c of the jacks 17, thereby withdrawing all of the bottom jack butts 18 clear of the jack raising cam 26. On the fixed support 27 there is also secured, by one of the screws 28, a permanent magnet 30 by means of which the swung-out upper ends of the pressers are held out to prevent them from returning inwards too early (unless forced to do so by patterning means in the manner presently to be described). Thus, none of the needles would knit at the feed were it not for the fact that, at the jack selecting station JS, the patterning butts 19d of predetermined ones of the pressers are acted upon by selectors the function of which is to force such pressers off and away from the magnet 30 with the result that the spring extensions 17c of the corresponding jacks 17 are thereupon permitted to swing outwards to position their bottom butts 18 in the path of the jack raising cam 26. Whenever such conditions are created by the patterning means the relevant jacks are raised and the needles corresponding thereto knit.

In the example being described there is provided, in advance of each feed, a patterning unit PU for selective action upon the patterning butts 19d for the purpose already mentioned. Each such unit includes a stationary bracket comprising a rectangular top plate 31 (see FIGS. 3 and 4), which is secured beneath the cam box support plate 14 by means of screws 32, and two vertical side plates 33 which are in turn attached, by further screws 34, to the longitudinal sides of the said top plate. The side plates 33 are accordingly spaced apart parallel to one another and depend from the top plate 31. Mounted in the bracket of each patterning unit PU is a bank of six selectors 35—one for each patterning butt plane. Each of these selectors is fulcrummed at 36 intermediate its ends for pivotal movements upwardly and downwardly about an axis $a$ transverse to the pressers 19 furnished with the patterning butts 19d: the selector is fixed so far as concerns any inward and outward radial movements thereof. In the illustrated case, the operative nose 35a of each selector 35 is normally maintained just below and clear of the relevant butt plane (as are five of the selector noses in FIG. 1), the selector being, however, so tiltable as to displace its nose upwardly into the appropriate butt plate (as is the remaining selector nose depicted in FIG. 1). But, as previously mentioned, this arrangement could, if desired, be reversed.

As will be seen in FIG. 2, each selector 35 comprises a forwardly directed limb 35b having the nose 35a at its operative end, a rearwardly directed tail 35c and, intermediate the two, a transverse fulcrum portion 35d. The limbs 35b are disposed strictly one above another and are suitably cranked to dispose their noses 35a in the superimposed planes occupied by the patterning butts 19d. But of the tails 35c, three are offset to the right and three to the left—for a purpose hereinafter to be mentioned.

To enable the selector 35 to be pivoted as described, there are attached to the inner ends of the two vertical side plates 33 of each patterning unit bracket a pair of fulcrum or pivot plates 37 the inner margins of which are deeply recessed at the places marked 37a in FIG. 4 to receive the ends of the transverse fulcrum portions 35d of the selectors. The ends of these fulcrum portions 35d are also so recessed that, when engaged with the fulcrum or pivot plates (which are like combs), any force and aft movements of the selectors are effectively prevented.

The electro- and permanent magnetic means in this example are arranged for action upon the selector tails 35c. Thus, each such selector tail extends through and is accordingly surrounded by a single electro-magnetic coil 38. That is to say, each tail 35c is arranged to move freely within the air gap in the coil. At opposite sides of the rearmost extremity of each selector tail 35c are located the opposite N and S poles 39a and 39b respectively of one permanent magnet 39. The parts designated 39 may, in fact, be regarded as magnetic straps connecting together the pole pieces 39a and 39b. Each coil 38 is adapted to be electrically pulsed, i.e. energised, in either of opposite directions as required to cause electromagnetisation of the relevant selector tail 35c and automatic reversals of the polarity of the latter upon changes in the directions of the electrical pulses. The idea in this case is that whenever a coil 38 is energised by the passage therethrough of current, the tail 35c of the corresponding selector 35 will be magnetised and assume such polarity as to be repelled by that pole of the permanent magnet 39 which is of the same polarity and attracted to and held by the other pole of the said permanent magnet, i.e. that of opposite polarity. In this way, the selector 35 will be turned in one direction about or relatively to its fixed pivot suchwise as to cause the operative nose 35a of the selector to be deflected from one of its two positions to the other in which latter position the selector will be positively held and retained by the relevant pole of the permanent magnet. Conversely, by oppositely pulsing the coil 38 and so reversing the current therein, the polarity of the magnetised tail 35c of the selector will be reversed with the result that the selector will be turned in the opposite direction to its other position in which it is again held—but this time by the opposite pole of the permanent magnet 39.

The electro-magnetic coils 38, complete with the formers 40 upon which they are wound, are carried by suitably spaced parallel coil support plates 41 which extend transversely between the side plates 33 of the patterning unit bracket. These side plates are recessed, as shown at 33a in FIG. 2, to locate the transverse plates 41 and the coil 38 interposed and clamped between them.

As regards the six permanent magnets 39 and their pole pieces 39a and 39b, these are secured by screws 42 to three horizontal carrier bars 43 which extend one above another between the aforesaid side plates 33. The ends of each such bar 43 are located in recesses 33b formed in the outer ends of the side plates 33 and are secured by screws 44.

Because the tail 35c of each selector 35 is associated with an electro-magnetic coil and a permanent magnet, which are comparatively bulky components, it is not possible for tails of the superimposed selectors in each bank to be closely spaced heightwise. It is thus advantageous, in respect of each patterning unit PU, to divide the tails 35c into two groups each of three, those in each group being sufficiently spaced apart vertically as to accommodate the relevant sets of coils 38 and magnets 39. This explains why three of the tails are offset to the right and three to the left, as previously mentioned, the arrangement keeping apart the respective groups of tails and relevant sets of magnetic means whilst at the same time enabling the forwardly directed limbs 35b of the selectors to be interleaved with their noses 35a arranged one above the other at the desired lesser vertical spacing.

In FIG. 5 is shown the ideal and most effective form of electro-magnetic coil $38^1$ wherein the former 40' upon which it is wound has a longitudinally tapered hub 40'' the inner, truncated-conical surface of which extends parallel to the relevant opposed surface of the selector tail 35c when this is tilted in either direction to the permitted maximum angle. By virtue of this construction, whenever a selector 35 is turned in either direction there will be a minimum air gap between its tail 35c and the hub of the former 40' so that the coil windings are as near to the selector as possible.

The programming of the selectors 35 of the various patterning units PU is effected from an endless pattern-controlling band of film 45 (see FIGS 6 and 8). The film passes around two sprocket drums 46 and 47 which are both adapted to be continuously driven from the needle cylinder driving gear 23 through the medium of intermediate gearing. It will be assumed that the machine has thirty six feeds in association with each of which there is provided one of the patterning units PU having a bank of six selectors. The pattern-controlling band 45 has formed transversely across its width equally spaced lines each comprising thirty six bits of information corresponding to the thirty six feeds of the machine. The bits in each such line are constituted by a predetermined interspersion of holes 48 and un-apertured spots 49. Viewing the film lengthwise there are, therefore, thirty six longitudinal rows of the holes 48 and unapertured spots 49. The transverse lines of information are arranged in successive sixes, i.e. 1st selector, 2nd selector, 3rd selector, 4th selector, 5th selector, 6th selector, 1st selector, 2nd selector, 3rd selector, 4th selector, 5th selector, 6th selector, 1st selector, and so on. Located at opposite sides of that portion of the film 45 extending between the two drums 46 and 47 are respectively a light source 50 and a row of thirty six photo-diodes 51, the latter being spaced apart at the same pitch as the thirty six bits of information in each transverse line.

An axial extension of the drum 46 controls the emission of what may be termed "routing" pulses for which purpose it has formed therein continuous sequences each of six holes 46a corresponding to the six selectors in a bank. A light source 52 is mounted within the routing drum 46 whilst there are provided on the outside of the latter six photo-diodes 53 spaced apart in a straight row at the pitch of the holes 46a. The positions of the light source 52 and of the photo-diodes 53, may, of course, be reversed, if desired. The drum 46, when rotating, accordingly gives rise to a continuous succession of routing pulses, one to every selector in turn without interruption.

The various photo-diodes are wired as at W into an electronic control box 54 incorporating logic drive amplifiers, a monostable flip-flop, a trigger circuit and a buffer stage, the purposes of all of which will be apparent to a person skilled in the art but are not important so far as an understanding of the present invention is concerned. Wiring from the control box 54 to the coils 38 of the electromagnets is indicated at $W^1$.

Each time a hole 48 in the film 45 registers with the relevant one of the thirty six photo-diodes 51 a patterning pulse is emitted. On the other hand, whenever an unapertured spot 49 is presented to a photo-diode 51 no patterning pulse is emitted. The behaviour of each selector 35 is decided by the pulse or pulses passed to the coil 38 of the electromagnet associated with that selector. Thus, the application to the coil of an electro-magnet of a patterning pulse combined with a routing pulse causes the nose of the corresponding selector to be moved into the relevant butt plane, or maintains the hose in that plane, as the case may be. But if an unapertured spot 49 of the film 45 happens to register with the appropriate photo-diode 51 so that no light shines on to it at the same instant that a routing pulse is applied to the said coil, then the nose of the selector will be moved out of the butt plane, or will be maintained out of the butt plane, as the case may be. In other words, whereas the combination of a patterning pulse with a routing pulse decides that the nose of a selector shall be in a butt plane, the emission of a routing pulse only decides that the selector nose shall be out of the butt plane.

In the embodiment of the invention already described, each selector is arranged to move freely within the air gap in the coil. There is, however, no limitation in this respect as the selector may extend alongside the coil on the outside thereof.

In a second embodiment of the invention illustrated in FIG. 9, each selector 55 is itself in the form of a pivoted permanent magnet the tail 55a of which, always of the same polarity, is arranged in a gap 56 between opposed ends 57a and 57b of an appropriately shaped core 57 of an electro-magnet designated generally by the numeral 58. Thus, in such an embodiment, electrical pulsing of the electro-magnet 58 will magnetise the core 57 and cause its opposed ends to assume respectively opposite polarities which will be automatically reversible upon a reversal of the pulsing. Consequently, each time the coil 59 is energised by a current pulse, the tail 55a of the permanently magnetic selector 55 will be repelled by one pole and attracted to and held by the other pole of the core 57, the selector thus being turned to either of its two positions depending on the direction of the current through the coil.

In a third embodiment depicted in FIG. 10, a complete electro-magnet 60, comprising a coil 61 and an iron core 62 co-axially arranged therein, is mounted upon and is thus movable together with each turnable selector 63, and there are provided at opposite sides of the latter, in alignment with the respectively opposite ends of the said core, two permanent magnets 64 and 65 disposed with like poles facing the core ends. Each selector 63 pivots at 66 and remains permanently in the corresponting butt plane.

According to yet another example, shown in FIG. 11, each selector 67 is mounted at its outer end to turn about a fixed pivot 68, and has a portion 67a thereof between its ends extending freely through the air gap 69 in a fixed coil 70 suchwise as to constitute the core of an electromagnet. The ends 67b and 67c of this core portion 67a of each selector—protruding through the opposite ends of the coil 70—are of opposite polarity whenever the core is magnetised by passage of an electrical pulse through the said coil. In this example, two U-shaped permanent magnets 71 and 72 are oppositely arranged at respectively opposite sides of each selector with their poles facing the ends 67b and 67c of the core portion of the selector. The poles of the electro-magnet constituted by the ends 67b and 67c of the core portion are, of course, automatically reversed whenever the direction of current through the coil is reversed. The selector 67 remains permanently in the corresponding butt plane.

Instead of the electro-magnetic means in association with each selector including only one coil within a single winding which can be pulsed in either direction as required, it is possible, as illustrated in FIG. 12, to employ with each selector two separate coils or windings 73 and 74 arranged to be individually pulsed in respectively opposite directions. Thus, in this case, each coil or winding is always pulsed in the same direction.

In yet another arrangement, each selector is associated with a single coil 75 (see FIG. 13) having a double winding 75a, 75b, current being passed through one of these windings always in one and the same direction and current being passed through the other winding always in the opposite direction.

I claim:

1. A multi-feed knitting machine including a needle bed formed with grooves; individually operable knitting instruments in said grooves provided with patterning butts disposed in a multiplicity of superimposed planes; at least one patterning unit comprising a bracket, a bank of selectors individually movable within said bracket and operable to effect action upon patterning butts in the said planes, a stack of electro-magnetic means for selectively actuating the said selectors, switch means in circuitry incorporating said electro-magnetic and signal-producing programming means movable in time with the motion of the knitting machine for influencing selective operation of the said switch means; said machine being characterised in that each of the selectors is deflectable to enable its leading portion to be moved from an inoperative position in which it is prevented from influencing patterning butts into an operative position to effect action upon such butts, and vice versa, and in that electro-magnetic means intimately associated with and in close proximity to each selector are combined with permanent magnetic means and adapted to be electrically pulsed in opposite directions, whereby the selector, as a consequence of mutual attraction of the electro-magnetic means and the permanent magnetic means at opposite sides thereof can be caused to be moved to and held by the permanent magnetic means in its operative and inoperative positions respectively.

2. A multi-feed knitting machine according to claim 1, wherein each selector is surrounded by and arranged to move freely within the air gap in electro-magnetic coil means which, when energised, causes electro-magnetisation of the selector itself, and at least one permanent magnet is arranged with its opposite poles at respectively opposite sides of an eletcro-magnetisable portion of the said selector.

3. A multi-feed circular knitting machine according to claim 1, wherein each selector is in the form of a pivoted permanent magnet the tail of which is always of the same polarity, and there is provided in association with each selector an electro-magnet having a core with opposed ends between which there is a gap wherein is located the aforesaid tail.

4. A multi-feed knitting machine according to claim 1, wherein an electro-magnet, comprising coil means and a core co-axially arranged therein, is mounted upon and movable in company with each selector, and there are provided at opposite sides of the latter, in alignment with the respectively opposite ends of the said core, two permanent magnets with like poles facing the core ends.

5. A multi-feed knitting machine according to claim 1, wherein each selector is mounted at its outer end to turn about a fixed pivot and has a portion thereof between its ends extending freely through an air gap in fixed coil means suchwise as to constitute the core of an electromagnet, the ends of this core portion, which protrude through the opposite ends of the coil, being of opposite polarity whenever the core is magnetised by passage of an electrical pulse through the coil means, and wherein two U-shaped permanent magnets are oppositely arranged at respectively opposite sides of each selector with their poles facing the ends of the core portion of the selector.

6. A multi-feed knitting machine according to claim 1, wherein the leading end of each of the selectors is movable upwardly and downwardly relatively to the knitting instruments provided with the patterning butts, the selector being fixed so far as any movements thereof towards and away from the needle bed are concerned, the selector being normally maintained either within or clear of the corresponding butt plane, and energisation of the associated electro-magnetic means by a pulse in the relevant sense being relied on to deflect the selector and so displace its leading end either upwardly or downwardly out of or into the butt plane, as the case may be.

7. A multi-feed knitting machine according to claim 1, wherein each selector remains permanently in the corresponding butt plane, being turnable in that plane about a fixed fulcrum so that its leading end is swingable to and fro in an arcuate path towards and away from the relevant patterning butts.

8. A multi-feed knitting machine according to claim 7, wherein each selector is fulcrummed at a point between its opposite ends in a bracket for pivotal movements upwardly and downwardly about an axis transverse to the knitting instruments formed with the patterning butts, the corresponding elecro-magnetic means and permanent magnetic means being arranged for action upon the tail of the selector.

9. A multi-feed knitting machine according to claim 1, wherein each selector is associated with a single coil having a double winding whereby current can be passed through one winding in one direction and through the other winding in the opposite direction.

10. A multi-feed knitting machine according to claim 2, wherein each electro-magnetic coil means is wound upon a hubbed former the hub of which is so longitudinally tapered that the inner surface of the said hub extends parallel to the corresponding selector when this is turned to either of its two positions suchwise as to minimise the extent of the air gap.

11. A multi-feed circular knitting machine including a rotary needle cylinder formed with axially extending parallel grooves; individually operable knitting needles in said grooves; jacks in the same grooves as, and beneath the needles for controlling the latter; each of said jacks having a depending extension with an operating butt thereon, this extension being normally outwardly disposed with its butt protruding from the relevant groove but capable of being pressed inwardly to withdraw said butt into the groove; a stationary cam box surrounding the needle cylinder; jack raising cams in said box, one in advance of each feed, for elevating jacks whose operating butts protrude from the corresponding grooves; fulcrummed pressers accommodated in the same grooves as the needles and jacks and arranged in front of the depending jack extensions, said pressers being provided with patterning butts in a multiplicity of superimposed planes; a plurality of stationary patterning units grouped around the rotary needle cylinder, one in advance of each feed, each such unit comprising a bracket, a bank of selectors individually movable within said bracket and operable to act selectively upon patterning butts in the said planes whereby predetermined ones of the pressers are left undisturbed to enable the operating butts on the corresponding jacks to miss the appropriate jack raising cam so that the jacks are not raised whilst the remaining pressers are pressed in so that the operating butts of the relevant jacks are acted upon by the said cam to raise the jacks, and a stack of electro-magnetic means for selectively actuating the said selectors; switch means in circuitry incorporating said electro-magnetic means, and, common to the several stacks of such last mentioned means, signal producing programming means movable in time with the rotary motion of the needle cylinder for influencing selective operation of the said switch means; said machine being characterised in that each of the selectors is fulcrummed at a point between its ends within the relevant bracket for pivotal movements upwardly and downwardly about an axis transverse to the pressers so that the leading end of the selector is tiltable upwardly and downwardly out of or into the relevant butt plane, and in that each such selector is surrounded by and arranged to move freely within an air gap in an electro-magnetic coil adapted, when pulsed in the appropriate direction to cause electromagnetisation of the selector so that it tilts upwardly or downwardly as aforesaid, at least one permanent magnet being arranged with its opposite poles at respectively opposite sides of an electro-magnetisable portion of the said selector, whereby the selector is held by the permanent magnet in either of the positions to which it is tilted.

12. A multi-feed circular knitting machine according to claim 11, wherein each electro-magnetic coil is wound upon a hubbed former the hub of which is so longitudinally tapered that the inner surface of the said hub extends parallel to the corresponding selector when this is turned to either of its two positions suchwise as to minimise the extent of the air gap.

References Cited

UNITED STATES PATENTS

| | | | |
|---|---|---|---|
| 3,229,482 | 1/1966 | Farmer | 66—50 |
| 3,263,453 | 8/1966 | Carrotte et al. | 66—50 |
| 3,283,541 | 11/1966 | Cerjat | 66—50 |
| 3,461,690 | 8/1969 | Martinetz et al. | 66—50 |

FOREIGN PATENTS

| | | | |
|---|---|---|---|
| 1,470,687 | 2/1967 | France | 66—50 |

RONALD FELDBAUM, Primary Examiner